(12) United States Patent
Zomet et al.

(10) Patent No.: US 9,195,654 B2
(45) Date of Patent: Nov. 24, 2015

(54) AUTOMATIC INVOCATION OF A DIALOG USER INTERFACE FOR TRANSLATION APPLICATIONS

(71) Applicants: Asaf Zomet, Tel Aviv (IL); Gal Chechik, Mountain View, CA (US); Michael Shynar, Tel Aviv (IL)

(72) Inventors: Asaf Zomet, Tel Aviv (IL); Gal Chechik, Mountain View, CA (US); Michael Shynar, Tel Aviv (IL)

(73) Assignee: Google Inc., Mountain View, CA (US)

( * ) Notice: Subject to any disclaimer, the term of this patent is extended or adjusted under 35 U.S.C. 154(b) by 313 days.

(21) Appl. No.: 13/834,371

(22) Filed: Mar. 15, 2013

(65) Prior Publication Data

US 2014/0278346 A1    Sep. 18, 2014

(51) Int. Cl.
*G06F 17/28* (2006.01)
*G06F 17/30* (2006.01)

(52) U.S. Cl.
CPC ........ *G06F 17/289* (2013.01); *G06F 17/30707* (2013.01)

(58) Field of Classification Search
CPC .............................. G10L 17/28; G10L 17/287
USPC ....................................................... 704/1–10
See application file for complete search history.

(56) References Cited

U.S. PATENT DOCUMENTS

| | | | | |
|---|---|---|---|---|
| 5,477,451 A | * | 12/1995 | Brown et al. | 704/9 |
| 5,583,761 A | * | 12/1996 | Chou | 715/201 |
| 5,748,974 A | | 5/1998 | Johnson | |
| 5,987,402 A | * | 11/1999 | Murata et al. | 704/2 |
| 6,047,252 A | * | 4/2000 | Kumano et al. | 704/2 |
| 8,185,372 B2 | * | 5/2012 | Sumita | 704/2 |
| 2006/0129409 A1 | | 6/2006 | Mizutani et al. | |
| 2006/0293876 A1 | * | 12/2006 | Kamatani et al. | 704/2 |
| 2007/0130563 A1 | * | 6/2007 | Elgazzar et al. | 717/137 |
| 2007/0244691 A1 | * | 10/2007 | Alwan et al. | 704/8 |
| 2008/0249760 A1 | * | 10/2008 | Marcu et al. | 704/2 |
| 2009/0222257 A1 | | 9/2009 | Sumita et al. | |
| 2012/0265518 A1 | * | 10/2012 | Lauder | 704/3 |
| 2014/0278346 A1 | * | 9/2014 | Zomet et al. | 704/3 |

FOREIGN PATENT DOCUMENTS

EP           0 749 074 A2    12/1996

OTHER PUBLICATIONS

Notification of Transmittal of the International Search Report and the Written Opinion of the International Searching Authority, or the Declaration corresponding to PCT/US2014/028046, mailed Sep. 10, 2014, 14 pages.

* cited by examiner

*Primary Examiner* — Michael N Opsasnick
(74) *Attorney, Agent, or Firm* — Harrity & Harrity, LLP

(57) ABSTRACT

A device is configured to receive a translation query that requests a translation of terms from a source language to a target language; determine translation features associated with the translation query; assign a feature value to each of the translation features to form feature values; apply a feature weight to each of the feature values to generate a final value; and determine whether to provide a dialog translation user interface or a non-dialog translation user interface based on whether the final value satisfies a threshold. The dialog translation user interface may facilitate translation of a conversation, the non-dialog translation user interface may provide translation search results, and the non-dialog translation user interface may be different than the dialog translation user interface. The device also configured to provide the dialog translation user interface for display when the final value satisfies the threshold.

20 Claims, 14 Drawing Sheets

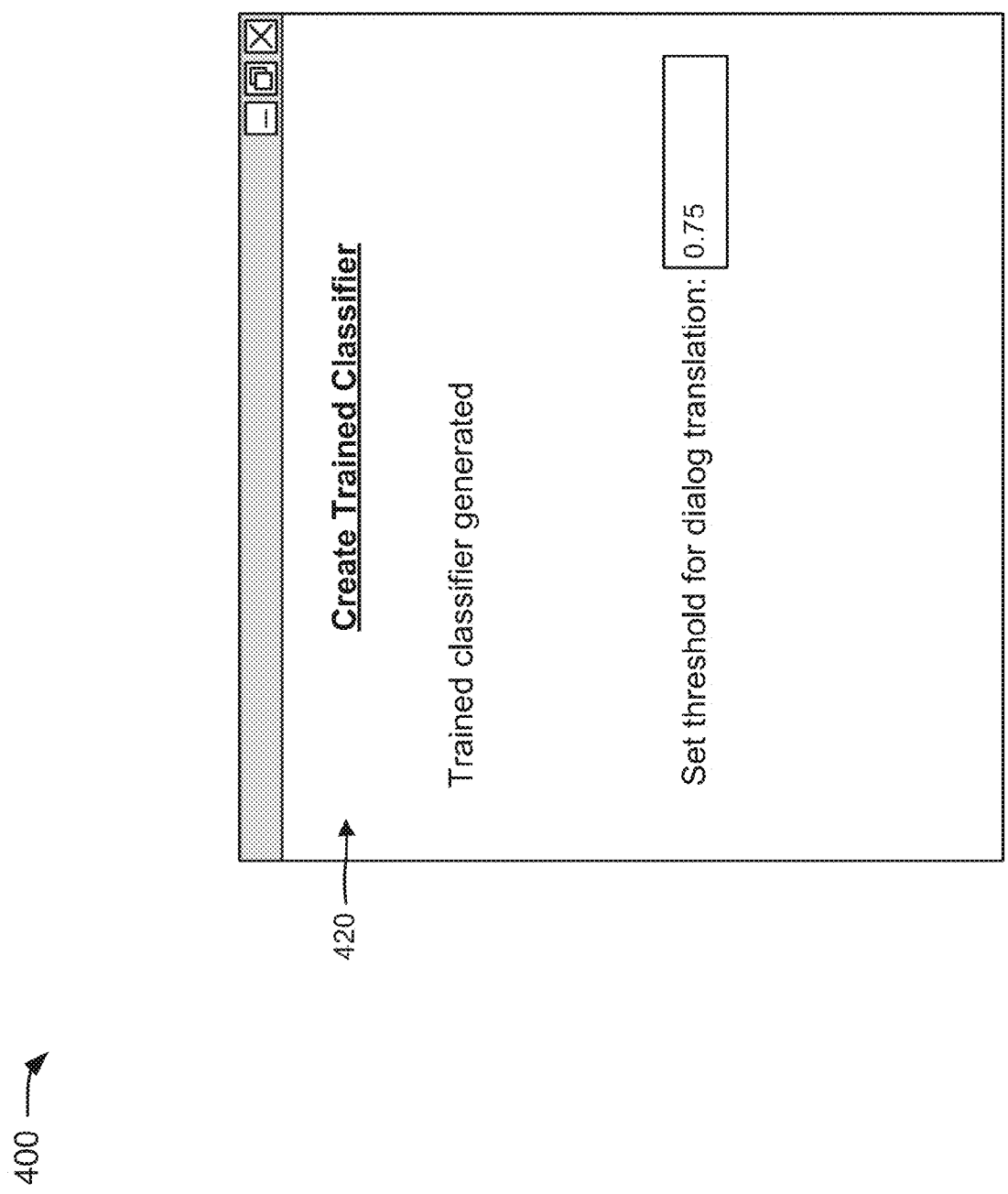

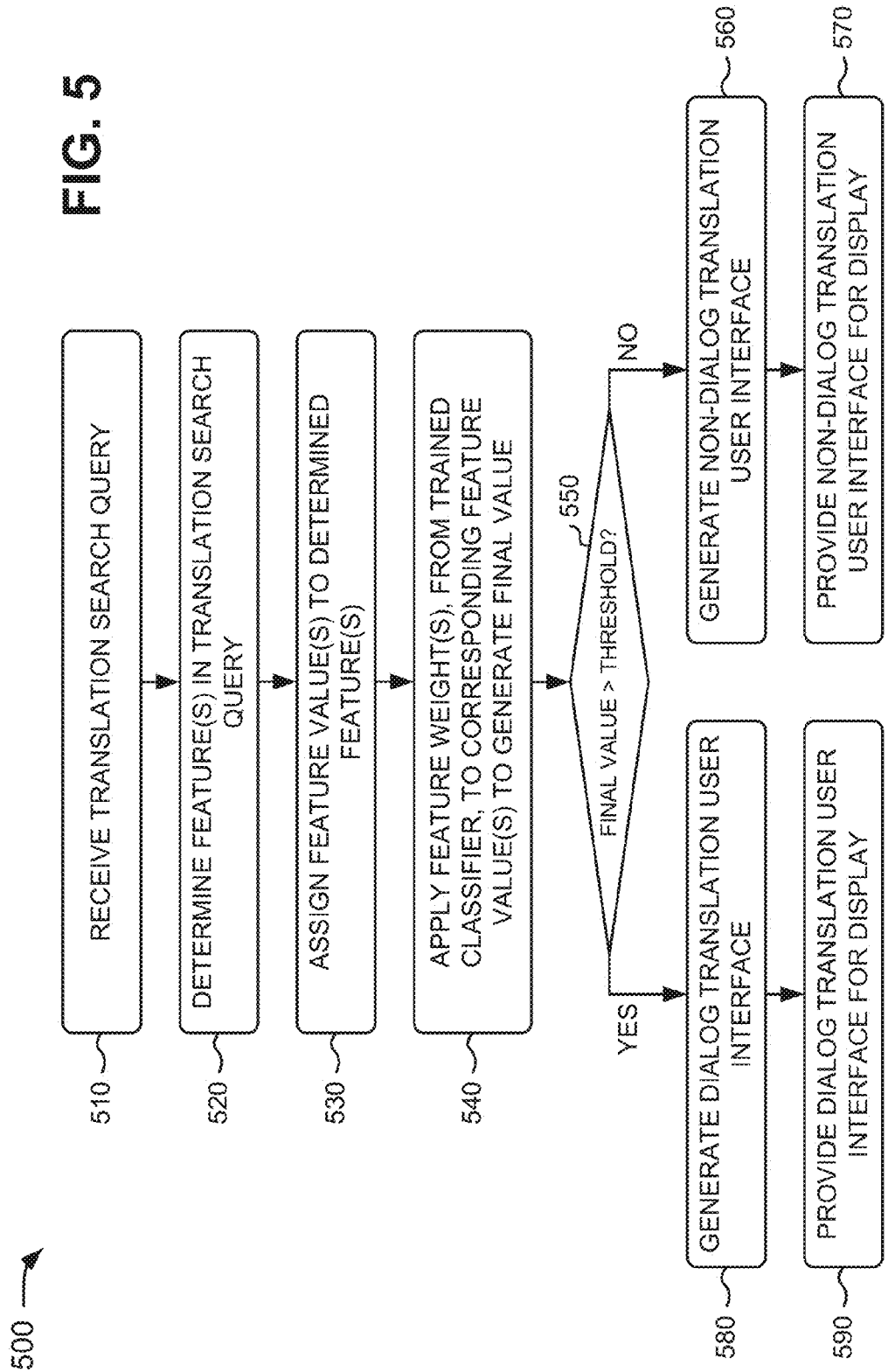

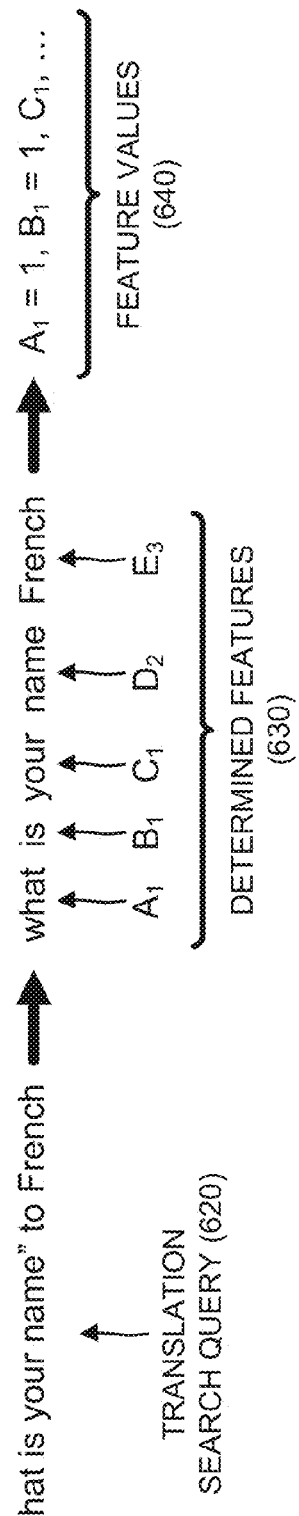

FIG. 6C

$$\text{Final Value} = w_{A1} \times A_1 + w_{B1} \times B_1 + w_{C1} \times C_1 + w_{D2} \times D_2 + w_{E3} \times E_3$$

WEIGHT (650)    650    650    650    650    650

600

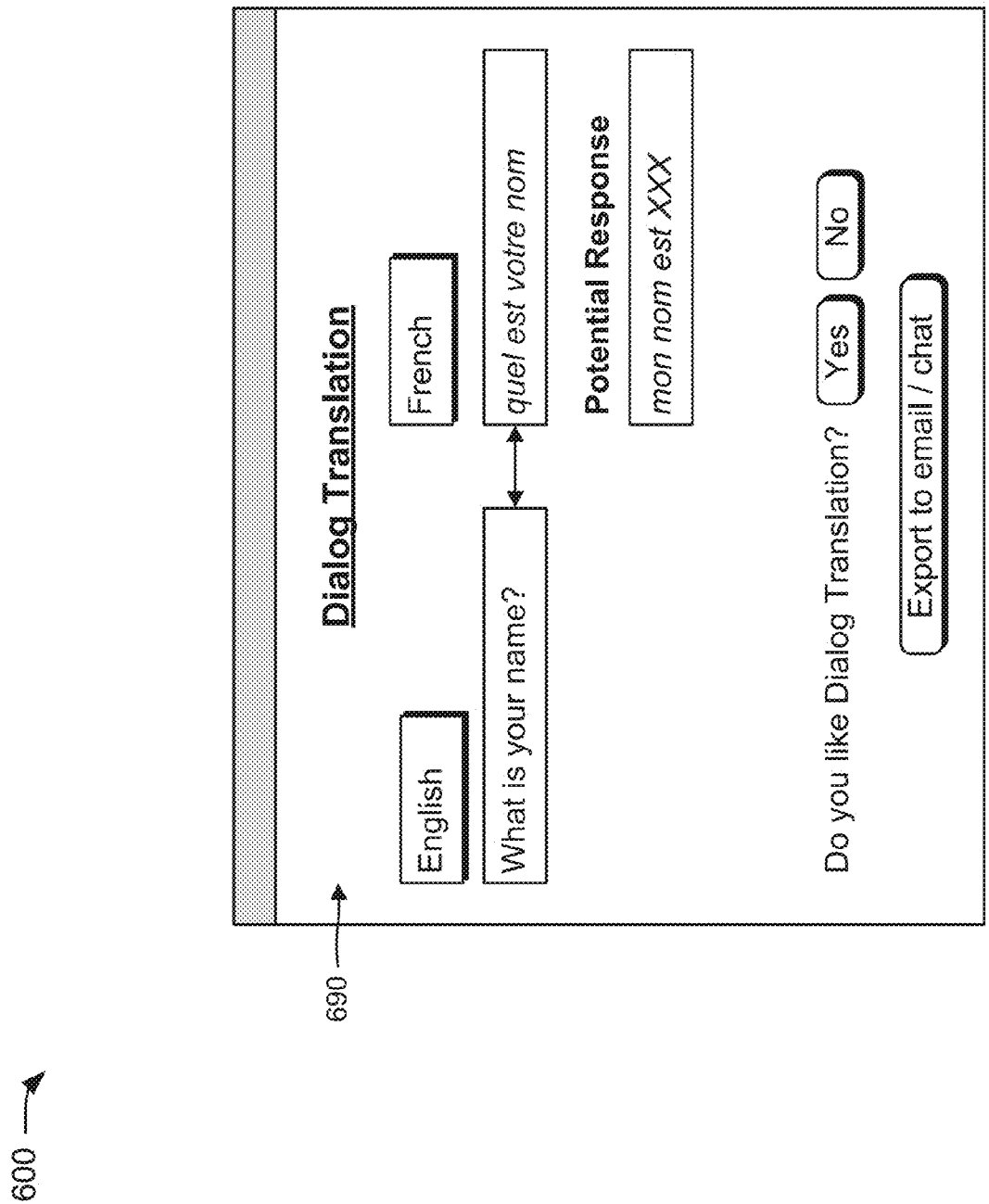

dialog training data and non-dialog training data; train a classifier based on the one or more translation features, the dialog training data, and the non-dialog training data; generate a plurality of feature weights based on the training of the classifier, the feature weight, applied to each of the one or more feature values, being selected from the plurality of feature weights; generate a trained classifier based on the plurality of feature weights; store the trained classifier; and receive the feature weight, applied to each of the one or more feature values, from the trained classifier.

AUTOMATIC INVOCATION OF A DIALOG USER INTERFACE FOR TRANSLATION APPLICATIONS

BACKGROUND

Automated translation services may be used with translation applications and for providing answers to search queries with translation intent, such as "translate 'what is your name' to French" or "how do you say 'where is the bus station' in Spanish." Translation queries may appear in several different types of scenarios, such as, for example, translating a paragraph or another portion of text, translating isolated words, translating sentences as part of a dialog, etc. Each of these scenarios may generate different sets of translations. For example, if a user is in a foreign country and wishes to converse in a local language, the user may need to translate isolated sentences back and forth from one language (e.g., source or target language) to another language (e.g., source or target language). The isolated sentences may create a conversation of meaningful questions and/or answers. However, the conversation may be displayed on a device in an overly crowded and complicated fashion. This is especially true for mobile devices that have limited display sizes.

SUMMARY

Described herein are devices and techniques for automatically determining a purpose or intent of a translation query, and adapting a translation and a translation user interface for the translation query. If the purpose of the translation search query is a dialog, the devices and techniques display a dialog translation user interface that enables a user to quickly and easily conduct a translated conversation or dialog with another user.

In some possible implementations, a method, performed by one or more processors of a device, may include: receiving a translation query that requests a translation of one or more terms from a source language to a target language; determining one or more translation features associated with the translation query; assigning a feature value to each of the one or more translation features to form one or more feature values; applying a feature weight to each of the one or more feature values, in a linear or non-linear manner, to generate a final value; determining whether to provide a dialog translation user interface or a non-dialog translation user interface based on whether the final value satisfies a threshold, the dialog translation user interface facilitating translation of a conversation, the non-dialog translation user interface providing one or more translation search results, and the non-dialog translation user interface being different than the dialog translation user interface; and providing the dialog translation user interface for display when the final value satisfies the threshold.

In some possible implementations, the method may further include providing the non-dialog translation user interface for display when the final value does not satisfy the threshold.

In some possible implementations, the method may further include receiving dialog training data and non-dialog training data; training a classifier based on the one or more translation features, the dialog training data, and the non-dialog training data; generating a plurality of feature weights based on the training of the classifier, the feature weight, applied to each of the one or more feature values, being selected from the plurality of feature weights; generating a trained classifier based on the plurality of feature weights; storing the trained classifier; and receiving the feature weight, applied to each of the one or more feature values, from the trained classifier.

In some possible implementations, the method may further include generating a translation, of the translation query, in the target language associated with the translation query; providing for display via the dialog translation user interface: the translation of the translation query in the target language, and the translation query in the source language; generating a potential response to the translation query in the target language associated with the translation query; and providing for display, via the dialog translation user interface, the potential response in the target language.

In some possible implementations, the method may further include receiving an indication that a user approves of the dialog translation user interface; and altering the threshold based on the indication.

In some possible implementations, the method may further include receiving a request to export information from the dialog translation user interface to a messaging application; and exporting the information from the dialog translation user interface to the messaging application based on the request.

In some possible implementations, the method may further include providing an option, via the dialog translation user interface, to change the source language or the target language associated with the translation query; and changing the source language or the target language when the option is selected by the user.

In some possible implementations, the method may further include providing, via the dialog translation user interface, a dialog history in the source language and the target language associated with the translation query.

In some possible implementations, a computer-readable medium may store one or more instructions that, when executed by one or more processors of a device, cause the one or more processors to: receive a translation query requesting a translation of one or more terms from a source language to a target language; determine one or more translation features associated with the translation query; assign a feature value to each of the one or more translation features to form one or more feature values; apply a feature weight to each of the one or more feature values, in a linear or non-linear manner, to generate a final value; determine whether to provide a dialog translation user interface or a non-dialog translation user interface based on whether the final value satisfies a threshold, the dialog translation user interface facilitating translation of a conversation, the non-dialog translation user interface providing one or more translation search results, and the non-dialog translation user interface being different than the dialog translation user interface; provide the dialog translation user interface for display when the final value satisfies the threshold; and provide the non-dialog translation user interface for display when the final value does not satisfy the threshold.

In some possible implementations, the computer-readable medium may further include one or more instructions that, when executed by the one or more processors, cause the one or more processors to: generate a translation, of the translation query, in the target language associated with the translation query; provide for display via the dialog translation user interface: the translation of the translation query in the target language, and the translation query in the source language; generate a potential response to the translation query in the target language associated with the translation query; and provide for display, via the dialog translation user interface, the potential response in the target language.

In some possible implementations, the computer-readable medium may further include one or more instructions that, when executed by the one or more processors, cause the one or more processors to: receive dialog training data and non-dialog training data; train a classifier based on the one or more translation features, the dialog training data, and the non-dialog training data; generate a plurality of feature weights based on the training of the classifier, the feature weight, applied to each of the one or more feature values, being selected from the plurality of feature weights; generate a trained classifier based on the plurality of feature weights; store the trained classifier; and receive the feature weight, applied to each of the one or more feature values, from the trained classifier.

In some possible implementations, the computer-readable medium may further include one or more instructions that, when executed by the one or more processors, cause the one or more processors to: receive a request to export information from the dialog translation user interface to a messaging application; and export the information from the dialog translation user interface to the messaging application based on the request.

In some possible implementations, the computer-readable medium may further include one or more instructions that, when executed by the one or more processors, cause the one or more processors to: receive an indication that a user approves of the dialog translation user interface; and alter the threshold based on the indication.

In some possible implementations, the computer-readable medium may further include one or more instructions that, when executed by the one or more processors, cause the one or more processors to: provide an option, via the dialog translation user interface, to change the source language or the target language associated with the translation query; and change the source language or the target language when the option is selected by the user.

In some possible implementations, the computer-readable medium may further include one or more instructions that, when executed by the one or more processors, cause the one or more processors to provide, via the dialog translation user interface, a dialog history in the source language and the target language associated with the translation query.

In some possible implementations, a device may include one or more processors to: receive a translation query requesting a translation of one or more terms from a source language to a target language; determine one or more translation features associated with the translation query; apply a feature weight to each of the one or more translation features, in a linear or non-linear manner to form one or more feature weights; generate a final value based on the one or more feature weights; determine whether to provide a dialog translation user interface or a non-dialog translation user interface based on whether the final value satisfies a threshold, the dialog translation user interface facilitating translation of a conversation, the non-dialog translation user interface providing one or more translation search results, and the non-dialog translation user interface being different than the dialog translation user interface; provide the dialog translation user interface for display when the final value satisfies the threshold; and provide the non-dialog translation user interface for display when the final value does not satisfy the threshold.

In some possible implementations, the one or more processors may be further to: receive an indication that a user approves of the dialog translation user interface; and alter the threshold based on the indication.

In some possible implementations, the one or more processors may be further to: receive a request to export information from the dialog translation user interface to a messaging application; and export the information from the dialog translation user interface to the messaging application based on the request.

In some possible implementations, the one or more processors may be further to: receive dialog training data and non-dialog training data; train a classifier based on the one or more translation features, the dialog training data, and the non-dialog training data; generate a plurality of feature weights based on the training of the classifier; generate a trained classifier based on the plurality of feature weights; store the trained classifier; and receive the feature weight, applied to each of the one or more translation features, from the plurality of feature weights of the trained classifier.

In some possible implementations, the one or more processors may be further to: generate a translation, of the translation query, in the target language associated with the translation query; provide for display via the dialog translation user interface: the translation of the translation query in the target language, and the translation query in the source language; generate a potential response to the translation query in the target language associated with the translation query; and provide for display, via the dialog translation user interface, the potential response in the target language.

In some possible implementations, a method, performed by a computer, may include: receiving, from a user device, speech information in a source language and a request for translating the speech information to a target language; determining feature values for translation features associated with the speech information; and sending, to the user device and based on an evaluation of the feature values, a translation of the speech information in the target language and a particular user interface or application to communicate the translation to a user of the user device, the user device rendering the translation via the user interface or the application.

In some possible implementations, a system may include means for receiving a translation query that requests a translation of one or more terms from a source language to a target language; means for determining one or more translation features associated with the translation query; means for assigning a feature value to each of the one or more translation features to form one or more feature values; means for applying a feature weight to each of the one or more feature values, in a linear or non-linear manner, to generate a final value; means for determining whether to provide a dialog translation user interface or a non-dialog translation user interface based on whether the final value satisfies a threshold, the dialog translation user interface facilitating translation of a conversation, the non-dialog translation user interface providing one or more translation search results, and the non-dialog translation user interface being different than the dialog translation user interface; and means for providing the dialog translation user interface for display when the final value satisfies the threshold.

Some implementations of the subject matter described in this specification can be implemented so as to realize one or more of the following advantages. A user may quickly and easily conduct a translated conversation or dialog with another user via a dialog translation user interface. In some implementations, a user visiting a foreign country may easily navigate around the foreign country, converse with residents of the foreign country, etc. The dialog translation user interface may be configured to provide the translated conversation in an organized fashion within the confines of a device display (e.g., a mobile device display).

Further implementations, features, and advantages of the disclosure, as well as the structure and operation of the various aspects of the disclosure are described in detail below with reference to accompanying drawings.

BRIEF DESCRIPTION OF THE DRAWINGS

The accompanying drawings, which are incorporated in and constitute a part of this specification, illustrate one or more implementations and, together with the description, explain these implementations. In the drawings:

FIGS. 4A and 4B are diagrams of an example of the process described in connection with FIG. 3;

FIG. 5 is a flow chart of an example process for generating dialog or non-dialog translation user interfaces based on a purpose of a translation search query;

FIGS. 6A-6G are diagrams of an example of the process described in connection with FIG. 5.

DETAILED DESCRIPTION

The following detailed description refers to the accompanying drawings. The same reference numbers in different drawings may identify the same or similar elements.

Systems and/or methods described herein may automatically determine a purpose or intent of a translation search query, and may adapt a translation and a translation user interface for the translation search query. For example, if the purpose of the translation search query is a dialog, the systems and/or methods may provide a dialog translation user interface for display. The dialog translation user interface may facilitate translation of a conversation within the confines of a device display. If the purpose of the translation search query is for something other than a dialog, the systems and/or methods may provide a non-dialog translation user interface for display. The non-dialog translation user interface may provide, for example, links to web sites with translation information.

Figure 1:
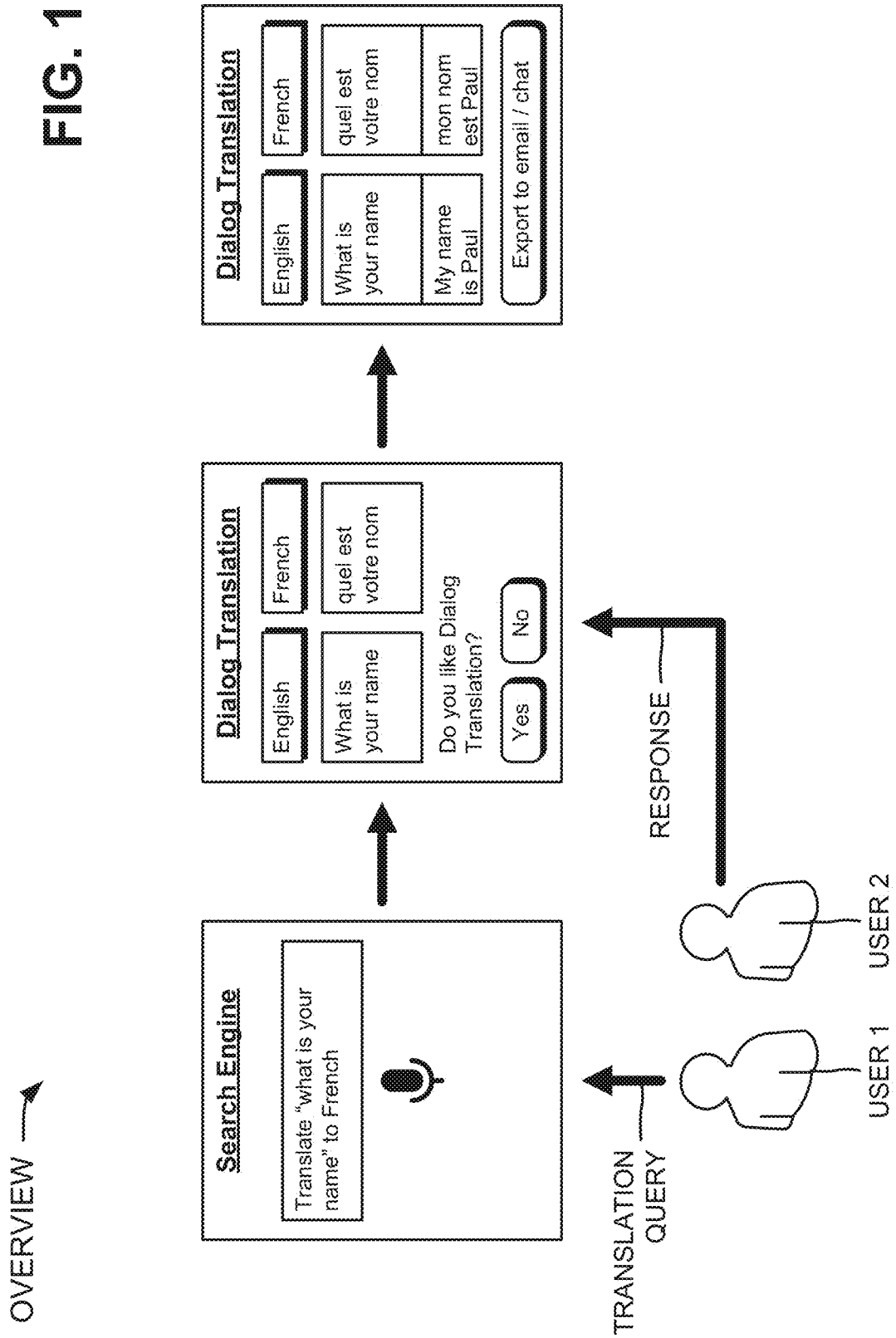
FIG. 1 is a diagram of an overview of an example implementation described herein.

FIG. 1 is a diagram of an overview of an example implementation described herein. For the overview, assume that a device (not shown in FIG. 1) is associated with a first user (USER 1) that wants to have a translated conversation with a second user (USER 2). Further assume that the first user speaks English and that the second user speaks French. The device may communicate with a server device (not shown in FIG. 1) that provides a search engine user interface to the device. The first user may utilize the device to provide a translation query (e.g., Translate "what is your name" to French) to the search engine user interface. The device may provide the translation query to the server device.

The server device may receive the translation query, and may determine one or more features in the translation query. In some implementations, the feature(s) may include appearance of particular words in the translation query, a quantity of words in the translation query, a source language and/or a target language associated with the translation query, etc. The server device may assign feature value(s) to the determined feature(s), and may apply feature weight(s) to corresponding feature value(s), in a linear or non-linear manner, to generate a final value. The server device may determine whether to provide a dialog translation user interface or a non-dialog translation user interface based on whether the final value satisfies a threshold. The dialog translation user interface may facilitate translation of a conversation, and the non-dialog translation user interface may be different than the dialog translation user interface.

The server device may provide the dialog translation user interface to the device when the final value satisfies the threshold. As shown in FIG. 1, the device may provide the dialog translation user interface for display to the first user. The dialog translation user interface may display an English version and a French version of the phrase "what is your name," and may ask whether the first user approves of the dialog translation user interface. If the first user indicates approval of the dialog translation user interface, the server device may utilize the approval to alter the threshold so that the dialog user interface is displayed more often to the first user.

As further shown in FIG. 1, the second user may provide a response (e.g., "mon nom est Paul") to the device, and the device may receive the response. The device may provide the response to the server device, and the server device may translate the response (e.g., to "my name is Paul"). The server device may update the dialog translation user interface to include the response, and may provide the updated dialog translation user interface to the device. The device may provide the updated dialog translation user interface for display to the first user and/or the second user, as further shown in FIG. 1. The updated dialog translation user interface may provide an object (e.g., a button, an icon, a link, etc.) that, when selected, may cause the device to export the updated dialog translation user interface to a messaging application, such as an email application, a chat application, etc.

Such an arrangement may enable a user to quickly and easily conduct a translated conversation or dialog with another user via a dialog translation user interface. In some implementations, this may enable a user visiting a foreign country to navigate around the foreign country, converse with residents of the foreign country, etc. The dialog translation user interface may be configured to provide the translated conversation in an organized fashion within the confines of a device display (e.g., a mobile device display).

User interfaces, as described herein, may include graphical user interfaces (GUIs) and/or non-graphical user interfaces, such as text-based interfaces. The user interfaces may provide information to users via customized interfaces (e.g., proprietary interfaces) and/or other types of interfaces (e.g., browser-based interfaces, etc.). In some implementations, the user interfaces may receive user inputs via one or more input devices, may be user-configurable (e.g., a user may change the sizes of the user interfaces, information displayed in the user interfaces, color schemes used by the user interfaces, positions of text, images, icons, windows, etc., in the user interfaces, etc.). In some implementations, the user interfaces may not be user-configurable. Information associated with the user interfaces may be selected and/or manipulated by a user of the device (e.g., via a touch screen display, a mouse, a keyboard, a keypad, voice commands, etc.).

A document, as the term is used herein, is to be broadly interpreted to include any machine-readable and machine-storable work product. A document may include, for example, an e-mail, a file, a combination of files, one or more files with embedded links to other files, a news group posting, a blog, a web advertisement, a Uniform Resource Locator (URL), etc. In the context of the Internet, a common document is a web page. Web pages often include textual information and may include embedded information (such as meta information, images, hyperlinks, etc.) and/or embedded instructions (such as Javascript, etc.).

Figure 2:
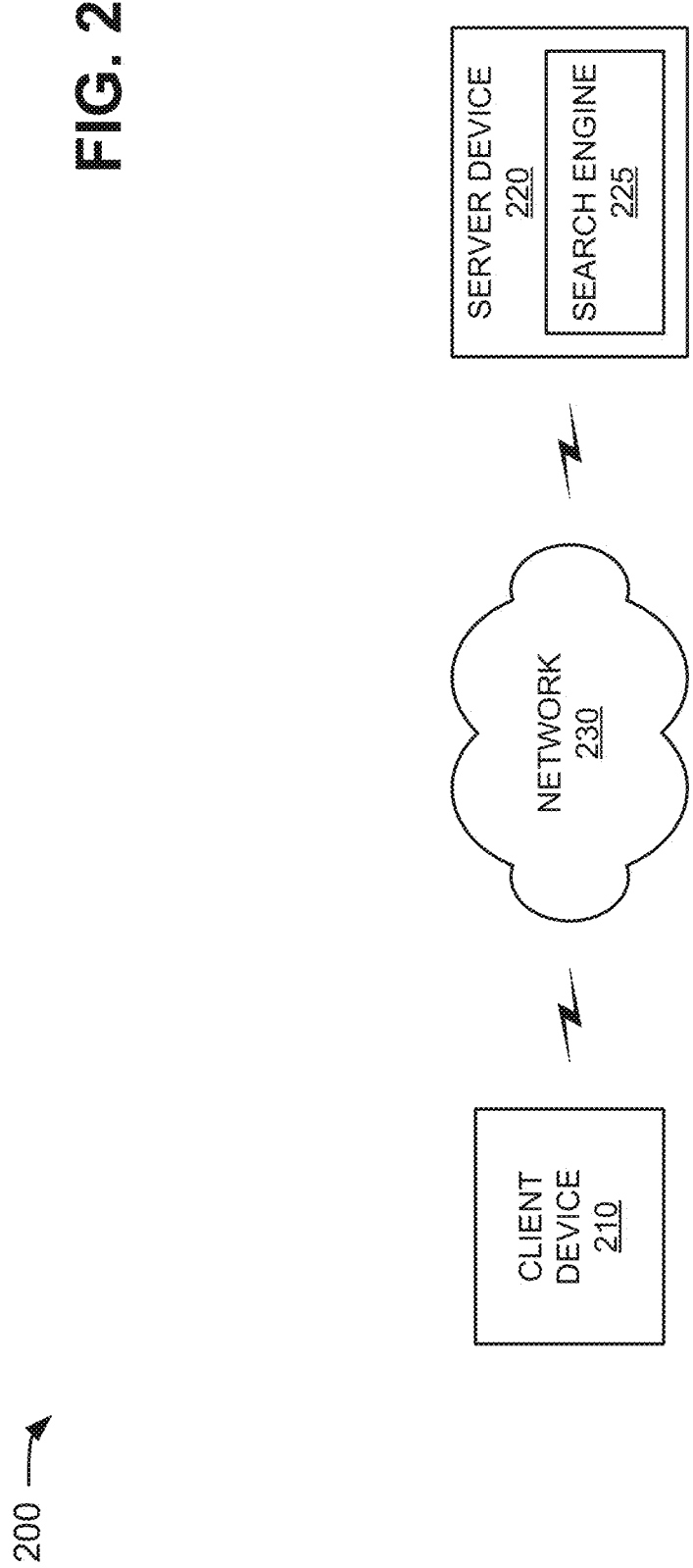
FIG. 2 is a diagram of an example environment in which systems and/or methods described herein may be implemented.

FIG. 2 is a diagram of an example environment 200 in which systems and/or methods described herein may be implemented. As illustrated, environment 200 may include a client device 210 interconnected with a server device 220 via a network 230. Components of environment 200 may interconnect via wired connections, wireless connections, or a combination of wired and wireless connections.

Client device 210 may include one or more computation devices, such as, for example, a laptop computer, a personal computer, a tablet computer, a desktop computer, a workstation computer, a smart phone, a personal digital assistant (PDA), and/or other computation devices. In some implementations, client device 210 may include a browser application that communicates with a search engine 225 provided in server device 220 and described below.

Server device 220 may include one or more server devices, or other types of computation and communication devices. Server device 220 may include a device that is capable of communicating with client device 210 (e.g., via network 230). In some implementations, server device 220 may include one or more laptop computers, personal computers, workstation computers, servers, central processing units (CPUs), graphical processing units (GPUs), application-specific integrated circuits (ASICs), field-programmable gate arrays (FPGAs), etc. In some implementations, server device 220 may include search engine 225 and may perform some or all of the functionality described herein for client device 210. Alternatively, server device 220 may be omitted and client device 210 may perform all of the functionality described herein as being performed by server device 220.

Search engine 225 may enable server device 220 to receive a search query from client device 210, and to search for documents in response to the search query. Search engine 225 may enable server device 220 to generate search results based on the search for documents, and to provide the search results to client device 210. In some implementations, the search results may include a line of results referred to as search engine results pages. In some implementations, search engine 225 may enable a user of client device 210 to provide a translation search query to server device 220. Server device 220 may receive the translation search query and may provide a dialog translation user interface or a non-dialog translation user interface to the user, as described herein.

Network 230 may include a network, such as a local area network (LAN), a wide area network (WAN), a metropolitan area network (MAN), a telephone network, such as the Public Switched Telephone Network (PSTN) or a cellular network, an intranet, the Internet, or a combination of networks.

Although FIG. 2 shows example devices of environment 200, in some implementations, environment 200 may include fewer devices, different devices, differently arranged devices, or additional devices than those depicted in FIG. 2. Alternatively, or additionally, one or more devices of environment 200 may perform one or more tasks described as being performed by one or more other devices of environment 200.

Figure 3:
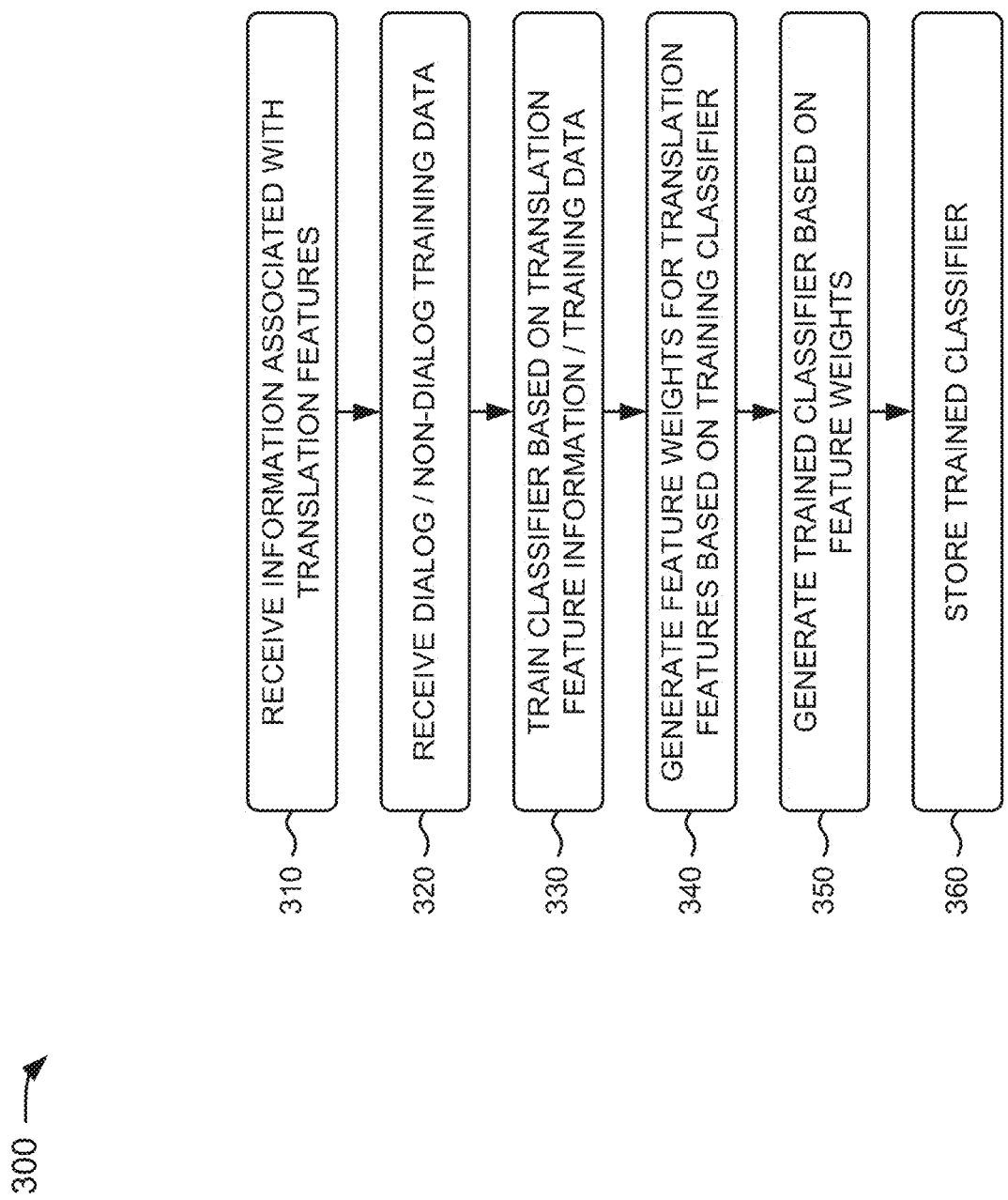
FIG. 3 is a flow chart of an example process for creating a trained classifier for determining a purpose of a translation search query.

FIG. 3 is a flow chart of an example process 300 for creating a trained classifier for determining a purpose of a translation search query. In some implementations, process 300 may be performed by server device 220. In some implementations, process 300 may be performed by another device or a group of devices (e.g., client device 210) separate from or including server device 220.

As shown in FIG. 3, process 300 may include receiving information associated with translation features (block 310). For example, server device 220 may provide, for display, a user interface that enables a user to define features (or criteria) that indicate a purpose of a translation search query. In some implementations, the features may be automatically generated by server device 220 instead of defined by the user. In some implementations, the user may label search queries based on how the user classifies the search queries. For example, the user may label a search query as having "dialog intent" or having "non-dialog intent."

In some implementations, a feature may include an appearance of particular words in the translation search query. For example, question words, such as "what" or "how," and courtesy words, such as "please" and "thank you," may be more frequent in the context of a dialog. In some implementations, a feature may include a quantity of words in the translation search query. For example, as a quantity of words in the translation search query increases, a probability increases that the purpose of the translation search query is a dialog. In some implementations, a feature may include a source language and/or a target language associated with the translation search query. For example, assume that a source language or a target language of the translation search query is Latin. This may indicate that the purpose of the translation search query is not a dialog (e.g., non-dialog) since Latin is a little used or dead language.

In some implementations, a feature may include a geographic location associated with client device 210 and a geographic location associated with a user of client device 210. For example, assume that a geographic location associated with the user is the United States and that a geographic location associated with client device 210 is a non-English language country (e.g., France). This may indicate that the user is traveling and that the purpose of the translation search query is a dialog. In some implementations, a feature may include an appearance of a combination of words or syntactical structures in the translation search query. For example, assume that the translation search query includes combinations of words, such as "Is this the way to XXX?" or "I am lost." Such combinations of words may indicate that the purpose of the translation search query is a dialog.

In some implementations, a feature may include a type associated with a device (e.g., client device 210) that provides the translation search query. For example, a translation search query provided by a mobile device (e.g., a smart phone) may indicate that the purpose of the translation search query is a dialog, whereas a translation search query provided by a fixed device (e.g., a desktop computer) may indicate that the purpose of the translation search query is not a dialog. In some implementations, a feature may include information (e.g., gender, age, job title, etc.) associated with a user of client device 210. For example, assume that the user of client device 210 is a salesperson who frequently travels to foreign countries. This may indicate that the purpose of the translation search query is a dialog. In some implementations, server device 220 may store the identified features.

As further shown in FIG. 3, process 300 may include receiving dialog and non-dialog training data (block 320). For example, server device 220 may provide, for display, a user interface that enables the user to identify a location (e.g., a filename) of dialog training data and non-dialog training data. In some implementations, server device 220 may create the dialog and non-dialog training data from information retrieved from a variety of sources. For example, server device 220 may create the dialog training data from anonymous chat dialog transcripts, phone dialog transcripts, etc.

received from, for example, service providers (e.g., Internet service providers, telecommunications service providers, etc.). Server device 220 may create the non-dialog training data from random search queries received by search engine 225.

In some implementations, server device 220 may receive the dialog training data and the non-dialog training data from a source, such as a Mechanical Turk. A Mechanical Turk may include a crowd sourcing Internet marketplace that enables computer programmers to coordinate the use of human intelligence to perform tasks that computers are currently unable to do. For example, the Mechanical Turk may provide textual information to human workers, and the human workers may label the textual information as being related to a dialog or a non-dialog. The dialog training data may include information identifying text with a high probability (e.g., greater than a threshold) of being associated with a dialog. The non-dialog training data may include information identifying text with a high probability (e.g., less than or equal to a threshold) of not being associated with a dialog. In some implementations, server device 220 may store the dialog training data and the non-dialog training data.

As further shown in FIG. 3, process 300 may include training a classifier based on the translation feature information and the training data (block 330). For example, server device 220 may train a classifier based on information associated with the features, the dialog training data, and the non-dialog training data. In some implementations, the classifier may include a machine learning classifier, such as classifiers based on support vector machines, boosting, decision tree learning, association rule learning, neural networks, genetic programming, inductive logic programming, clustering, Bayesian networks, reinforcement learning, representation learning, similarity and metric learning, sparse dictionary learning, etc. In some implementations, the classifier may include a classifier based on stochastic regularized online learning.

In some implementations, server device 220 may train the classifier by providing information known to belong to specified classes (e.g., the dialog training data and the non-dialog training data), and creating the classifier on the basis of that known information. Training the classifier may be an iterative process.

Returning to FIG. 3, process 300 may include generating feature weights for the translation features based on the training of the classifier (block 340). For example, server device 220 may generate feature weights for the features based on training the classifier with the dialog training data and the non-dialog training data. In some implementations, server device 220 may calculate a feature weight for a particular feature based on how many times the particular feature appears in the the dialog training data or the non-dialog training data. For example, assume that server device 220 determines that a feature ($A_1$), associated with the appearance of particular words in the translation search query, appears in the dialog training data thirty (30) times. Further assume that the dialog training data includes one-hundred (100) observations. In this scenario, server device 220 may calculate a feature weight ($w_{A1}$) of "0.3" for the feature ($A_1$).

In some implementations, the feature weights may be any value between "0 and "1" and may depend on the features associated with the feature weights. For example, features that are better indicators of a dialog translation may be accorded higher feature weights than feature weights accorded to features that are less indicative of a dialog translation.

As further shown in FIG. 3, process 300 may include generating a trained classifier based on the feature weights (block 350). For example, server device 220 may utilize the feature weights to generate a trained classifier. In some implementations, server device 220 may generate the trained classifier according to the following equation:

$$\text{Final Value} = w_{A1} \times A_1 + w_{B1} \times B_1 + w_{C1} \times C_1 + w_{D2} \times D_2 + w_{E3} \times E_3 \ldots,$$

where the Final Value may include a final calculation produced by the trained classifier for the translation search query, $w_{A1}$ may include a feature weight of a first feature ($A_1$), $w_{B1}$ may include a feature weight of a second feature (BA etc. In some implementations, each feature may be designated by a letter (e.g., A, B, C, etc.) and a type for a feature may be designated by a number (e.g., 1, 2, 3, etc.). For example, the feature associated with the appearance of particular words in the translation search query may be designated with the letter A. A question word (e.g., "what") of feature (A) may be designated with the number one (1) so that the word "what" may be designated with the term $A_1$. A courtesy word (e.g., "thank you") of feature (A) may be designated with the number two (2) so that the word "thank you" may be designated with the term $A_2$.

In some implementations, the final value calculated by the trained classifier may be based on any non-linear function of the features, such as, for example, a polynomial function, a set of logical conditions, a combination of non-linear functions, etc. In some implementations, the final value calculation may be based on machine learning methods, such as support vector machines, boosting, decision tree learning, association rule learning, neural networks, genetic programming, inductive logic programming, clustering, Bayesian networks, reinforcement learning, representation learning, similarity and metric learning, sparse dictionary learning, etc. The trained classifier may provide weights not only for individual features, but also for non-linear combinations of features.

Returning to FIG. 3, process 300 may include storing the trained classifier (block 360). For example, server device 220 may store the trained classifier in a memory device associated with server device 220. In some implementations, server device 220 may provide the trained classifier to search engine 225 and/or a translation application provided by server device 220. Search engine 225 and/or the translation application may utilize the trained classifier to determine whether a purpose of a translation search query is for a dialog or a non-dialog, as described below.

While FIG. 3 shows process 300 as including a particular quantity and arrangement of blocks, in some implementations, process 300 may include fewer blocks, additional blocks, or a different arrangement of blocks. Additionally, or alternatively, some of the blocks may be performed in parallel.

Figure 4A:
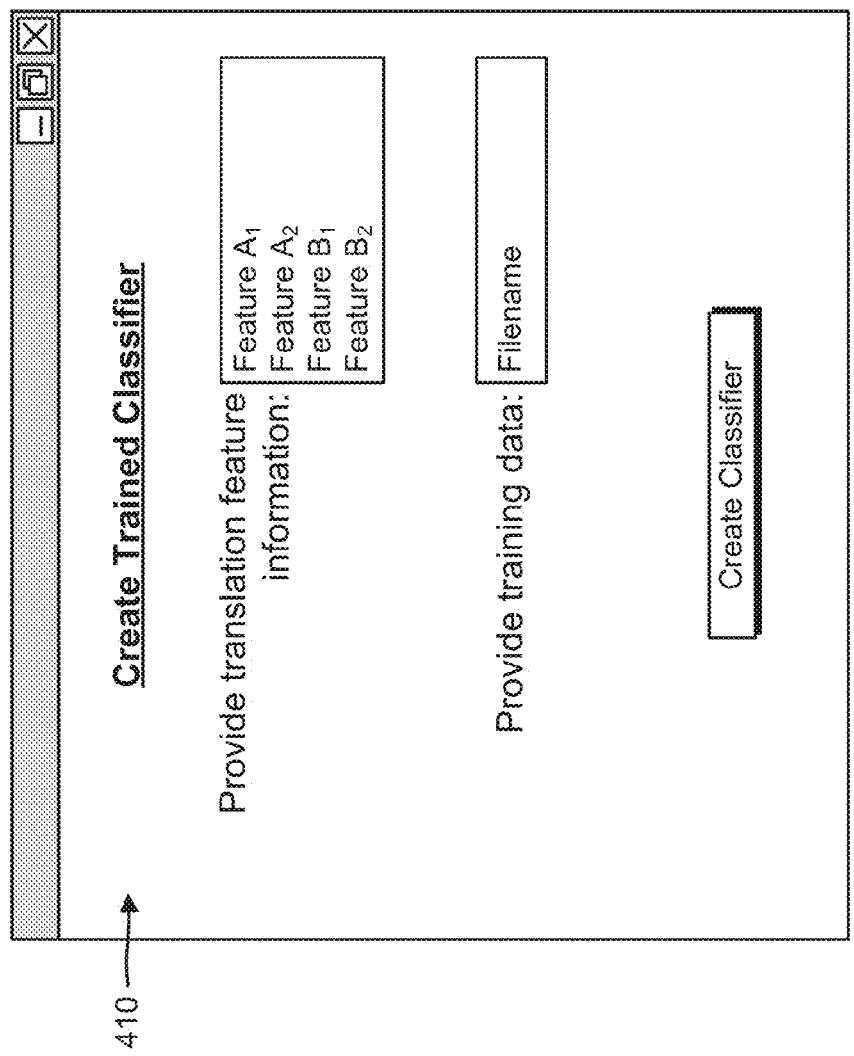

FIGS. 4A and 4B are diagrams of an example 400 of the process described in connection with FIG. 3. In example 400, assume that server device 220 provides, for display, a user interface 410 that enables a user to create a trained classifier. As shown, user interface 410 may request that the user provide translation feature information. Assume further that the user defines the features, described above in connection with FIG. 3, in user interface 410. The user may further define types associated with the features in user interface 410. For example, the user may define a feature ($A_1$) for the question word "what," and may define a feature ($A_2$) for the courtesy word "thank you." The user may define a feature ($B_1$) for the word combination "Is this the way to XXX," and may define a feature ($B_2$) for the word combination "I am lost."

In some implementations, the features may be predefined by server device 220 instead of defined by the user. In some implementations, the user may label search queries based on how the user classifies the search queries. For example, the user may be asked to label a search query as having "dialog intent" or having "non-dialog intent."

As further shown in FIG. 4A, user interface 410 may enable the user to identify a location (e.g., a filename) of dialog training data and non-dialog training data. In example 400, assume that the user provides the location (e.g., filename) of a file that includes the dialog training data and the non-dialog training data. Server device 220 may retrieve the dialog training data and the non-dialog training data from the file, and may store the dialog training data and the non-dialog training data.

In some implementations, server device 220 may create the dialog and non-dialog training data from information retrieved from a variety of sources. For example, server device 220 may create the dialog training data from anonymous chat dialog transcripts, phone dialog transcripts, etc. Server device 220 may create the non-dialog training data from random search queries received by search engine 225. In some implementations, server device 220 may receive the dialog training data and the non-dialog training data from a source, such as a Mechanical Turk.

After the features are defined for the classifier and the dialog training data and the non-dialog training are received, the user may select an object (e.g., a Create Classifier button, icon, link, etc.), as further shown in FIG. 4A. Selection of the object may cause server device 220 to train a classifier based on the defined features, the dialog training data, and the non-dialog training data. Server device 220 may generate feature weights for the features based on training the classifier with the dialog training data and the non-dialog training data. Server device 220 may generate a trained classifier based on the feature weights, and may store the trained classifier. In some implementations, server device 220 may provide the trained classifier to search engine 225 and/or a translation application provided by server device 220.

After the trained classifier is generated and stored, server device 220 may provide, for display, a user interface 420 that indicates that the trained classifier has been generated, as shown in FIG. 4B. As further shown, user interface 420 may request that the user set a threshold for dialog translation. The threshold for dialog translation may be used by server device 220 to determine whether to provide a dialog translation user interface or a non-dialog translation user interface for display in response to a translation search query. Further details of the threshold for dialog translation are provided below. In example 400, assume that the user initially sets the threshold for dialog translation to a particular value (e.g., 0.75), as further shown in FIG. 4B.

FIG. 5 is a flow chart of an example process 500 for generating dialog or non-dialog translation user interfaces based on a purpose of a translation search query. In some implementations, process 500 may be performed by server device 220. In some implementations, process 500 may be performed by another device or a group of devices (e.g., client device 210) separate from or including server device 220.

As shown in FIG. 5, process 500 may include receiving a translation search query (block 510). For example, a user associated with client device 210 may provide a translation search query to client device 210. In some implementations, the user may provide the translation search query to a browser application or a translation application executing on client device 210. In some implementations, the user may input the translation search query to client device 210 via mechanisms, such as a keyboard, a touch screen display, etc. In some implementations, the user may verbally provide the translation search query to client device 210.

The translation search query may be for a dialog purpose or for a non-dialog purpose. For example, a translation search query, such as "translate what is your name to French," may be for a dialog purpose. A translation search query, such as "translate car to Spanish" may for a non-dialog purpose. In some implementations, a translation search query received from a mobile client device 210 (e.g., a smart phone) may be for a dialog purpose, whereas a translation search query received from a fixed client device 210 (e.g., a desktop computer) may be for a non-dialog purpose.

Client device 210 may provide the translation search query to server device 220. Server device 220 may receive the translation search query, and, in some implementations, may store the translation search query.

As further shown in FIG. 5, process 500 may include determining one or more features in the translation search query (block 520). For example, server device 220 may determine whether the translation search query includes any of the features defined above in connection with FIG. 3. In some implementations, server device 220 may determine that the translation search query includes a feature when the translation search query includes particular words (e.g., questions words, courtesy words, etc.) or a particular quantity of words (e.g., greater than three words, four words, etc.). Server device 220 may determine that the translation search query includes a feature when a source language or a target language of the translation search query includes a little used language (e.g., Latin). Server device 220 may determine that the translation search query includes a feature when the translation search query includes particular combinations of words or syntactical structures (e.g., "Where is the airport?").

In some implementations, server device 220 may determine that the translation search query includes features based on properties of client device 210 and/or the user associated with client device 210. For example, server device 220 may determine that the translation search query includes a feature when a geographic location of client device 210 is in a country foreign to a geographic residence of the user. Server device 220 may determine that the translation search query includes a feature when client device 210 is a mobile device rather a fixed device. Server device 220 may determine that the translation search query includes a feature when user properties indicate that the user is traveling (e.g., the user's calendar may indicate that the user is traveling to Germany on particular days).

As further shown in FIG. 5, process 500 may include assigning feature value(s) to the determined feature(s) (block 530). For example, server device 220 may assign a feature value to each feature determined to be present in the translation search query. In some implementations, server device 220 may assign a particular feature value (e.g., "1") to each feature present in the translation search query, and may assign another particular feature value (e.g., "0") to each feature not present in the translation search query. Such an arrangement may ensure that the features existing in the translation search query are given proper weights, and that features not existing in the translation search query are not given any weight. In some implementations, server device 220 may assign different feature values to different features existing in the translation search query (e.g., a value of "1" to a first feature, a value of "3" to a second feature, etc.).

In some implementations, the feature values may be any value between "0 and "1" and may depend on the features associated with the feature values. For example, features that are better indicators of a dialog translation may be accorded higher feature values than feature values accorded to features that are less indicative of a dialog translation.

In some implementations, server device 220 may provide designations to the feature values. For example, server device 220 may provide a designation ($A_1$) to a first type of a first feature, a designation ($A_2$) to a second type of the first feature, a designation ($B_1$) to a first type of a third feature, etc.

Returning to FIG. 5, process 500 may include applying the feature weight(s), from a trained classifier, to corresponding feature value(s) to generate a final value (block 540). For example, server device 220 may apply feature weight(s), of the trained classifier described above in connection with FIGS. 3-4B, to corresponding feature value(s), and may calculate a final value based on the feature weight(s) and feature value(s). In some implementations, server device 220 may apply the feature weight(s) of the trained classifier to the feature value(s) according to a weighted sum equation:

$$\text{Final Value} = w_{A1} \times A_1 + w_{B1} \times B_1 + w_{C1} \times C_1 + w_{D2} \times D_2 + w_{E3} \times E_3 \ldots,$$

As further shown in FIG. 5, process 500 may include determining whether the final value satisfies a threshold (block 550). For example, server device 220 may determine whether the final value satisfies a threshold for dialog translation. The threshold may be used by server device 220 to determine whether to provide a dialog translation user interface or a non-dialog translation user interface for display in response to the translation search query. In some implementations, the threshold may be satisfied when the final value is greater than a threshold value, and may not be satisfied when the final value is less than or equal to the threshold value, or vice versa.

Returning to FIG. 5, if the final value does not satisfy the threshold (block 550—NO), process 500 may include generating a non-dialog translation user interface (block 560). For example, if server device 220 determines that the final value does not satisfy the threshold, server device 220 may generate a non-dialog translation user interface. In some implementations, the non-dialog translation user interface may include a user interface generated by search engine 225 and/or a translation application provided by server device 220. In some implementations, the non-dialog translation user interface may be different than the dialog translation user interface. An example of a non-dialog translation user interface will be described with respect to FIG. 6D.

As further shown in FIG. 5, process 500 may include providing the non-dialog translation user interface for display (block 570). For example, server device 220 may provide the generated non-dialog translation user interface to client device 210. Client device 210 may receive the non-dialog translation user interface, and may display the non-dialog translation user interface to the user. The user may interact with the non-dialog translation user interface to, for example, select a link for a web site that provides translation information.

Returning to FIG. 5, if the final value satisfies the threshold (block 550—YES), process 500 may include generating a dialog translation user interface (block 580). For example, if server device 220 determines that the final value satisfies the threshold, server device 220 may generate a dialog translation user interface. In some implementations, the dialog translation user interface may be configured to provide a translated conversation in an organized fashion within the confines of a device display (e.g., a mobile device display). Examples of dialog translation user interfaces will be described with respect to FIGS. 6E and 6G.

As further shown in FIG. 5, process 500 may include providing the dialog translation user interface for display (block 590). For example, server device 220 may provide the generated dialog translation user interface to client device 210. Client device 210 may receive the dialog translation user interface, and may display the dialog translation user interface to the user.

While FIG. 5 shows process 500 as including a particular quantity and arrangement of blocks, in some implementations, process 500 may include fewer blocks, additional blocks, or a different arrangement of blocks. Additionally, or alternatively, some of the blocks may be performed in parallel.

Figure 6A:
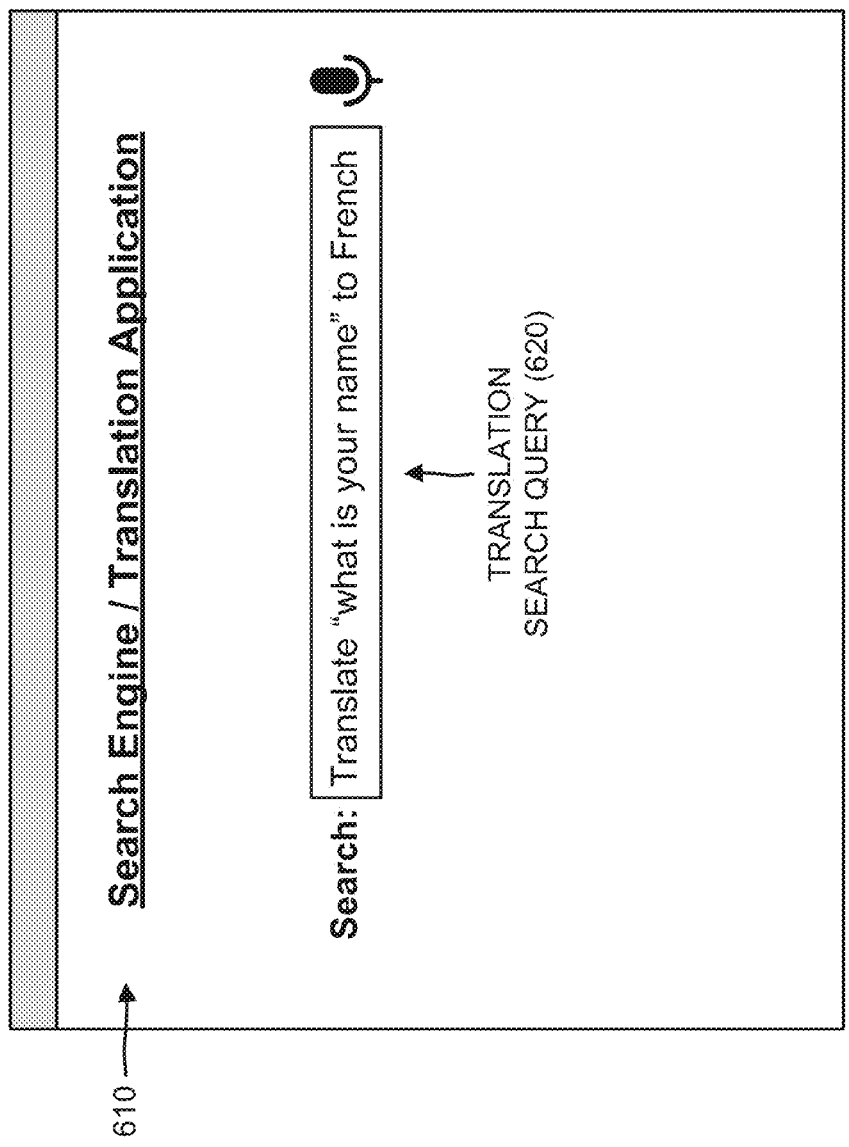

FIGS. 6A-6G are diagrams of an example 600 of the process described in connection with FIG. 5. In example 600, assume that a user utilizes client device 210 to access search engine 225 or a translation application provided by server device 220. When client device 210 accesses search engine 225 or the translation application, server device 220 may provide a user interface 610 to client device 210, and client device 210 may provide user interface 610 for display to the user, as shown in FIG. 6A. User interface 610 may include a search box in which the user may provide a translation search query 620. In some implementations, the user may verbally input translation search query 620 to client device 210. As further shown in FIG. 6A, assume that the user enters "Translate 'what is your name' to French" as translation search query 620.

Client device 210 may provide translation search query 620 to server device 220, and server device 220 may receive translation search query 620. Server device 220 may determine whether translation search query 620 includes any of the features defined above in connection with FIG. 3. For example, as shown in FIG. 6B, server device 220 may determine that the word "what" is associated with a first type of a first feature 630 ($A_1$), and that the word "is" is associated with a first type of a second feature 630 ($B_1$). Server device 220 may determine that the word "your" is associated with a first type of a third feature 630 ($C_1$), and that the word "name" is associated with a second type of a fourth feature 630 ($D_2$). Server device 220 may determine that the word "French" is associated with a third type of a fifth feature 630 ($E_3$).

As further shown in FIG. 6B, server device 220 may assign a feature value 640 to each feature 630 determined to be present in translation search query 620. In some implementations, server device 220 may assign a particular feature value 640 (e.g., "1") to each feature 630 present in translation search query 620. For example, server device 220 may assign the particular feature value 640 to features 630 (e.g., $A_1$, $B_1$, $C_1$, $D_2$, and $E_3$). In example, 600, server device 220 may also designate feature values 640 as $A_1$, $B_1$, $C_1$, $D_2$, and $E_3$. Server device 220 may assign another particular feature value 640 (e.g., "0") to each feature not present in translation search query 620.

As shown in FIG. 6C, server device 220 may apply feature weights 650, of the trained classifier described above in connection with FIGS. 3-4B, to corresponding feature values 640, and may calculate a final value based on feature weights 650 and feature values 640. As further shown, server device 220 may apply feature weights 650 to feature values 640 according to a weighted sum equation:

$$\text{Final Value} = w_{A1} \times A_1 + w_{B1} \times B_1 + w_{c1} \times C_1 + w_{D2} \times D_2 + w_{E3} \times E_3 \ldots$$

The Final Value may include a final calculation produced by the trained classifier for translation search query 620, $w_{A1}$ may include feature weight 650 of feature value 640 ($A_1$), $w_{B1}$ may include feature weight 650 of feature value 640 ($B_1$), $w_{C1}$ may include feature weight 650 of feature value 640 ($C_1$), $w_{D2}$ may include feature weight 650 of feature value 640 ($D_2$), and $w_{E3}$ may include feature weight 650 of feature value 640 ($E_3$).

Figure 6D:
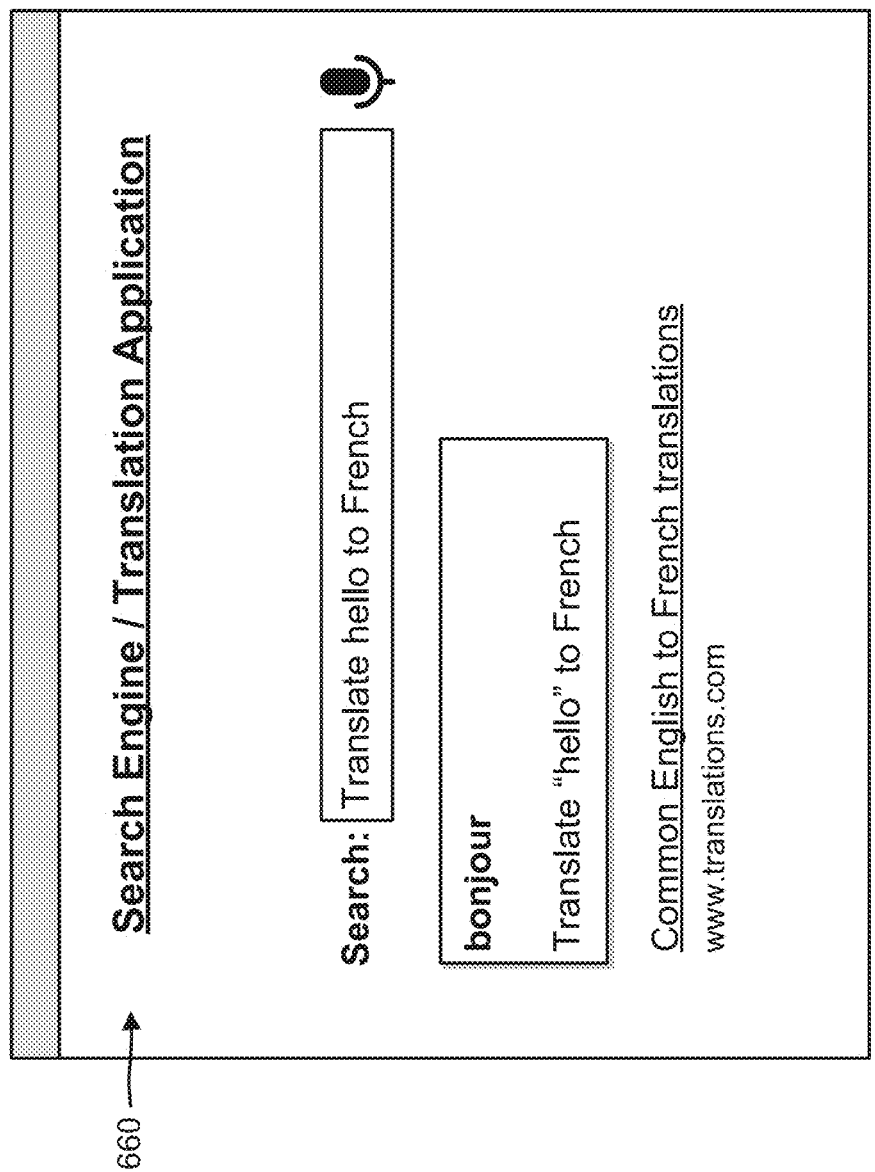

Server device 220 may determine whether the final value satisfies a threshold for dialog translation. If server device 220 determines that the final value does not satisfy the threshold, server device 220 may generate a non-dialog translation user interface 660. Server device 220 may provide non-dialog translation user interface 660 to client device 210. Client device 210 may receive non-dialog translation user interface 660, and may display non-dialog translation user interface 660 to the user, as shown in FIG. 6D. Non-dialog translation user interface 660 may include a user interface generated by search engine 225 and/or a translation application provided by server device 220. As further shown in FIG. 6D, non-dialog translation user interface 660 may display a translation (e.g., "bonjour") of the word "hello" to French in a box below a search input box, and may display a ranked list of documents that may provide a translation of the word "hello" to French. In this situation, server device 220 may determine that the translation search query "translate hello to French" is not associated with a dialog.

Figure 6E:
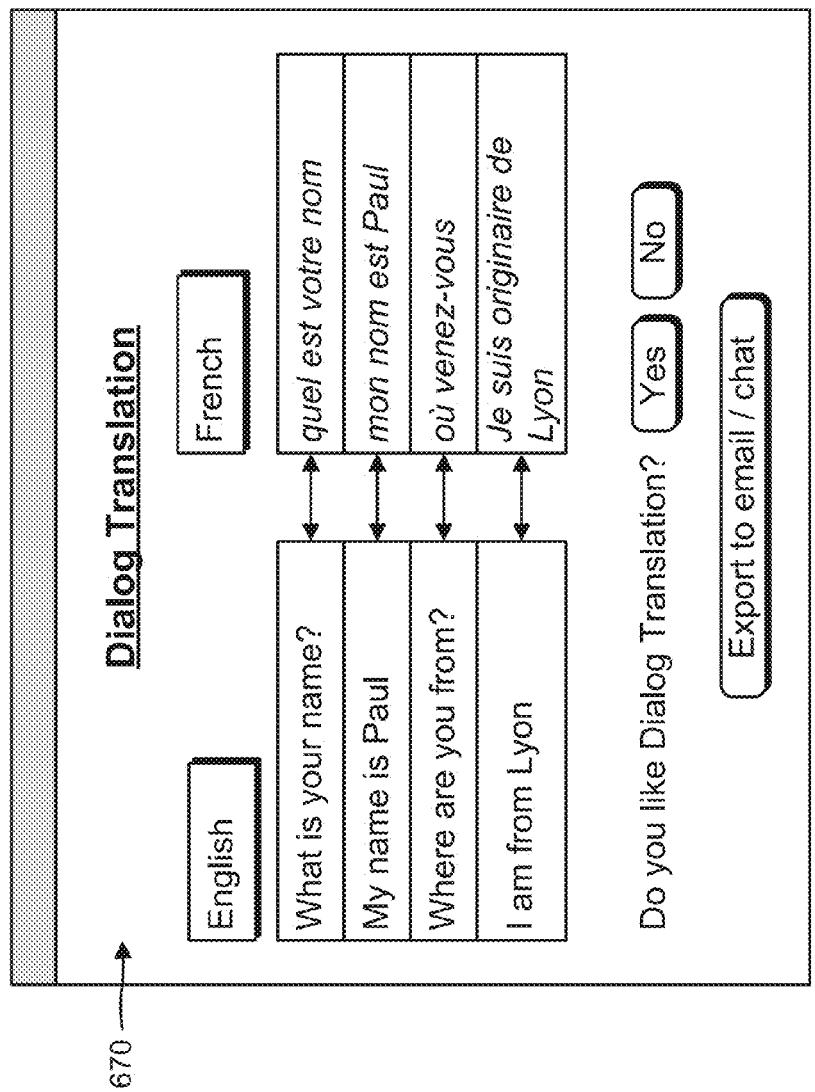

If server device 220 determines that the final value satisfies the threshold, server device 220 may generate a dialog translation user interface 670. Server device 220 may provide dialog translation user interface 670 to client device 210. Client device 210 may receive dialog translation user interface 670, and may display dialog translation user interface 670 to the user, as shown in FIG. 6E. Dialog translation user interface 670 may be configured to provide a translated conversation in an organized fashion within the confines of a device display. For example, dialog translation user interface 670 may display a dialog in French and English, which may aid the user (e.g., who speaks English) in having a conversation with a person who speaks French. In some implementations, the user may change the source language (e.g., English) and/or the target language (e.g., French) of dialog translation user interface 670. For example, the user may interchange the source language and the target language of dialog translation user interface 670.

In some implementations, dialog translation user interface 670 may display an entire history of a dialog or conversation in both the source language and the target language. As further shown in FIG. 6E, dialog translation user interface 670 may request that the user indicate whether the user likes dialog translation user interface 670. If the user indicates that the user likes dialog translation user interface 670, server device 220 may adjust the threshold for dialog translation so that dialog translation user interface 670 appears more frequently for the user. For example, server device 220 may decrease the threshold value if the user indicates that the user likes dialog translation user interface 670. If the user indicates that the user does not like dialog translation user interface 670, server device 220 may adjust the threshold so that dialog translation user interface 670 appears less frequently for the user.

Figure 6F:
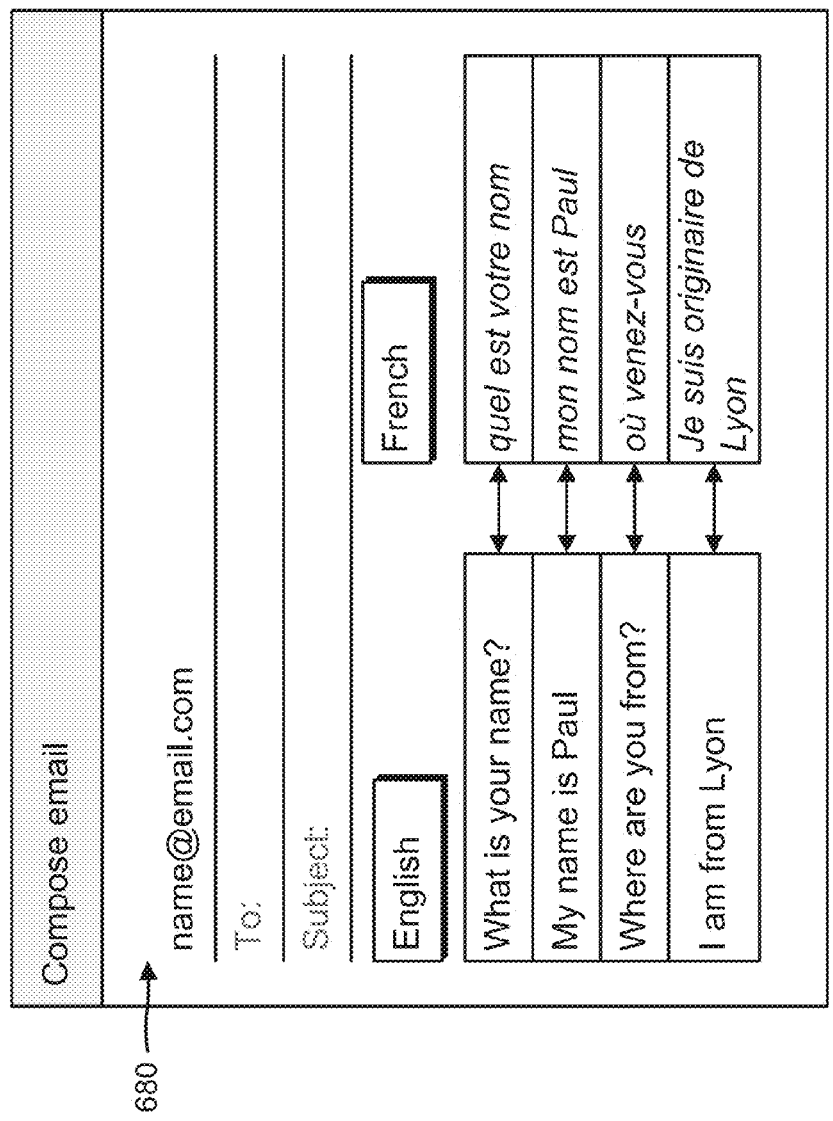

As further shown in FIG. 6E, dialog translation user interface 670 may display an object (e.g., an Export button, icon, link, etc.) that may be selected by the user when the user wants to export dialog translation user interface 670 to a messaging application (e.g., an email application, a text messaging application, etc.). When the user selects the object, server device 220 may instruct client device 210 to provide dialog translation user interface 670 to a messaging application of client device 210. For example, client device 210 may automatically open an email application user interface 680, as shown in FIG. 6F, and may automatically populate a body of an email message with information from dialog translation user interface 670. The user may provide a recipient for the email message, and may instruct client device 210 to send the email message to the recipient.

In some implementations, dialog translation user interface 670 may display a potential response to a question, before the response is provided. For example, as indicated by reference number 690 in FIG. 6G, dialog translation user interface 670 may display a question in English (e.g., "What is your name?") and in French (e.g., "quel est votre nom"). As further shown, dialog translation user interface 670 may display a potential response to the question in French (e.g., "mon nom est XXX").

In some implementations, dialog translation user interface 670 may be used to provide translated subtitles for a video being played by client device 210 or captured (e.g., via a camera) by client device 210. For example, if the user accesses a French video via client device 210, server device 220 may provide dialog translation user interface 670 to client device 210 so that English subtitles may be provided for the French video.

In some implementations, if server device 220 detects that client device 210 is entering a foreign country, server device 220 may utilize dialog translation user interface 670 to automatically translate documents accessible by client device 210. For example, if the user is traveling to Spain and needs to show English language documents to a Spanish client, server device 220 may automatically translate the documents to Spanish when server device 220 detects that client device 210 is entering Spain. In some implementations, server device 220 may download a Spanish phrase document or book to client device 210 when server device 220 detects that client device 210 is entering Spain.

Figure 7:
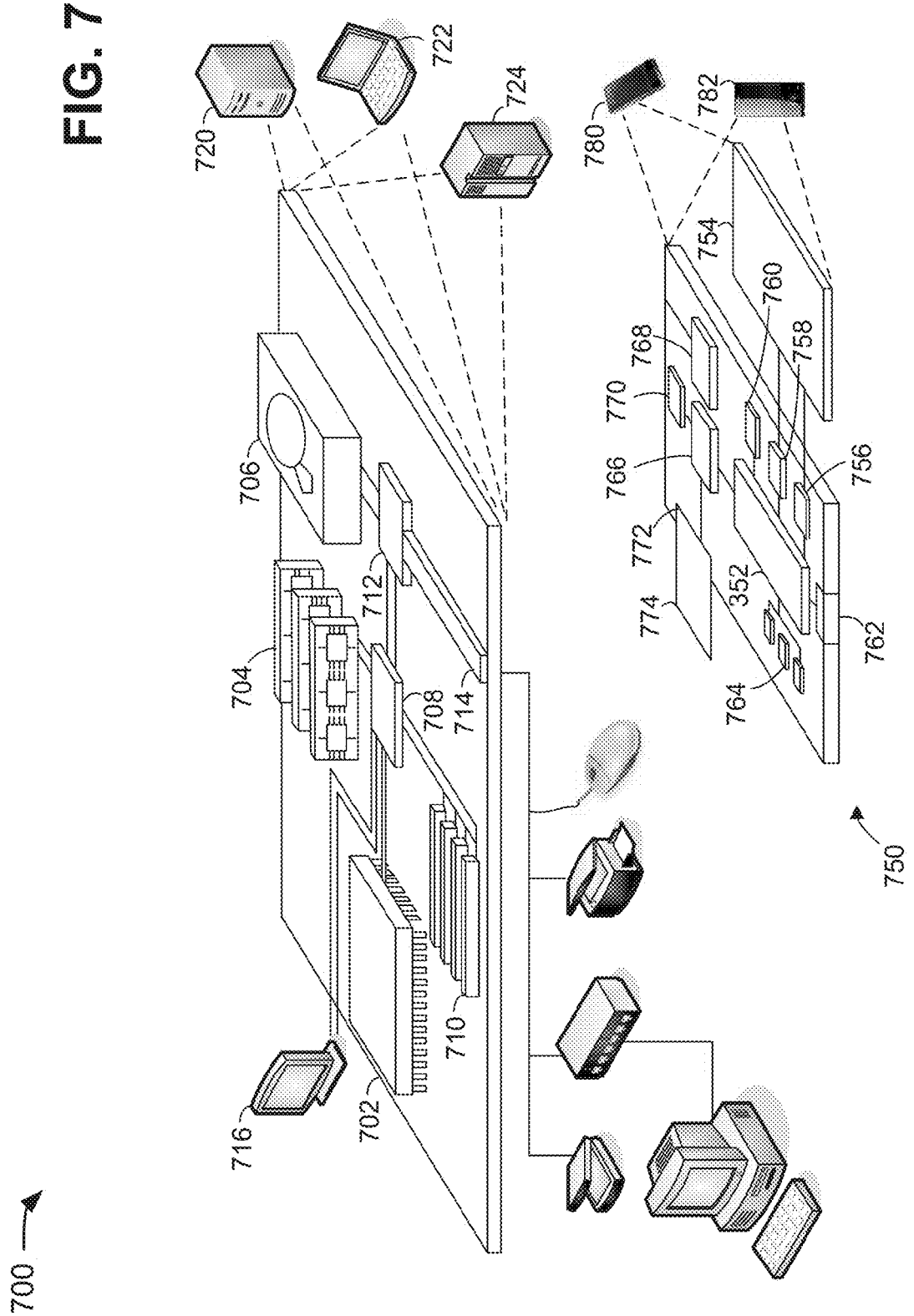
FIG. 7 is a diagram of an example of a generic computing device and a generic mobile computing device, which may be used with the techniques described herein.

FIG. 7 is a diagram of an example of a generic computing device 700 and a generic mobile computing device 750, which may be used with the techniques described herein. Generic computing device 700 or generic mobile computing device 750 may correspond to, for example, client device 210 and/or server device 220. Computing device 700 is intended to represent various forms of digital computers, such as laptops, desktops, workstations, personal digital assistants, servers, blade servers, mainframes, and other appropriate computers. Mobile computing device 750 is intended to represent various forms of mobile devices, such as personal digital assistants, cellular telephones, smart phones, tablet computers, and other similar computing devices. The components shown in FIG. 7, their connections and relationships, and their functions, are meant to be examples only, and are not meant to limit implementations described herein.

Computing device 700 may include a processor 702, a memory 704, a storage device 706, a high-speed interface 708 connecting to memory 704 and high-speed expansion ports 710, and a low-speed interface 712 connecting to a low-speed expansion port 714 and a storage device 706. Each of components 702, 704, 706, 708, 710, 712, and 714, are interconnected using various buses, and may be mounted on a common motherboard or in other manners as appropriate. Processor 702 can process instructions for execution within computing device 700, including instructions stored in memory 704 or on storage device 706 to display graphical information for a graphical user interface (GUI) on an external input/output device, such as display 716 coupled to high-speed interface 708. In other implementations, multiple processors and/or multiple buses may be used, as appropriate, along with multiple memories and types of memory. Also, multiple computing devices 700 may be connected, with each device providing portions of the necessary operations, as a server bank, a group of blade servers, or a multi-processor system, etc.

Memory 704 stores information within computing device 700. In one implementation, memory 704 includes a volatile memory unit or units. In another implementation, memory 704 may include a non-volatile memory unit or units. Memory 704 may also be another form of computer-readable medium, such as a magnetic or optical disk. A computer-readable medium may refer to a non-transitory memory device. A memory device may refer to storage space within a single storage device or storage space spread across multiple storage devices.

Storage device 706 is capable of providing mass storage for computing device 700. In one implementation, storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly implemented in an information carrier. The computer program product may also contain instructions that, when executed, perform one or more methods, such as those described herein. The information carrier is a computer or machine-readable medium, such as memory 704, storage device 706, or a memory on processor 702.

High-speed interface 708 manages bandwidth-intensive operations for computing device 700, while low-speed interface 712 manages lower bandwidth-intensive operations. Such allocation of functions is only an example. In one implementation, high-speed interface 708 is coupled to memory 704, display 716 (e.g., through a graphics processor or accelerator), and to high-speed expansion ports 710, which may accept various expansion cards. In this implementation, low-speed interface 712 may be coupled to storage device 706 and low-speed expansion port 714. Low-speed expansion port 714, which may include various communication ports (e.g., USB, Bluetooth, Ethernet, wireless Ethernet, etc.), may be coupled to one or more input/output devices, such as a keyboard, a pointing device, a scanner, or a networking device such as a switch or router, e.g., through a network adapter.

Computing device 700 may be implemented in a number of different forms, as shown in the figure. For example, computing device 700 may be implemented as a standard server 720, or multiple times in a group of such servers. Computing device 700 may also be implemented as part of a rack server system 724. In addition, computing device 700 may be implemented in a personal computer, such as a laptop computer 722. Alternatively, components from computing device 700 may be combined with other components in a mobile device (not shown), such as mobile computing device 750. Each of such devices may contain one or more of computing devices 700, 750, and an entire system may be made up of multiple computing devices 700, 750 communicating with each other.

Mobile computing device 750 may include a processor 752, a memory 764, an input/output (I/O) device, such as a display 754, a communication interface 766, and a transceiver 768, among other components. Mobile computing device 750 may also be provided with a storage device, such as a microdrive or other device, to provide additional storage. Each of the components 752, 764, 754, 766, and 768 are interconnected using various buses, and several of the components may be mounted on a common motherboard or in other manners as appropriate.

Processor 752 can execute instructions within mobile computing device 750, including instructions stored in memory 764. Processor 752 may be implemented as a chipset of chips that include separate and multiple analog and digital processors. Processor 752 may provide, for example, for coordination of the other components of mobile computing device 750, such as control of user interfaces, applications run by mobile computing device 750, and wireless communication by mobile computing device 750.

Processor 752 may communicate with a user through control interface 758 and display interface 756 coupled to a display 754. Display 754 may be, for example, a Thin-Film-Transistor Liquid Crystal Display (TFT LCD) or an Organic Light Emitting Diode (OLED) display, or other appropriate display technology. Display interface 756 may include appropriate circuitry for driving display 754 to present graphical and other information to a user. Control interface 758 may receive commands from a user and convert the commands for submission to processor 752. In addition, an external interface 762 may be provided in communication with processor 752, so as to enable near area communication of mobile computing device 750 with other devices. External interface 762 may provide, for example, for wired communication in some implementations, or for wireless communication in other implementations, and multiple interfaces may also be used.

Memory 764 stores information within mobile computing device 750. Memory 764 can be implemented as one or more of a computer-readable medium or media, a volatile memory unit or units, or a non-volatile memory unit or units. Expansion memory 774 may also be provided and connected to mobile computing device 750 through expansion interface 772, which may include, for example, a Single In Line Memory Module (SIMM) card interface. Such expansion memory 774 may provide extra storage space for device 750, or may also store applications or other information for mobile computing device 750. Specifically, expansion memory 774 may include instructions to carry out or supplement the processes described herein, and may include secure information also. Thus, for example, expansion memory 774 may be provided as a security module for mobile computing device 750, and may be programmed with instructions that permit secure use of mobile computing device 750. In addition, secure applications may be provided via the SIMM cards, along with additional information, such as placing identifying information on the SIMM card in a non-hackable manner.

Expansion memory 774 may include, for example, flash memory and/or NVRAM memory. In one implementation, a computer program product is tangibly implemented in an information carrier. The computer program product contains instructions that, when executed, perform one or more methods, such as those described above. The information carrier is a computer- or machine-readable medium, such as memory 764, expansion memory 774, or a memory on processor 752, that may be received, for example, over transceiver 768 or external interface 762.

Mobile computing device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through transceiver 768. In addition, short-range communication may occur, such as using a Bluetooth, WiFi, or other such transceiver (not shown). In addition, Global Positioning System (GPS) receiver module 770 may provide additional navigation- and location-related wireless data to mobile computing device 750, which may be used as appropriate by applications running on mobile computing device 750.

Mobile computing device 750 may also communicate audibly using audio codec 760, which may receive spoken information from a user and convert the received spoken information to digital information. Audio codec 760 may likewise generate audible sound for a user, such as through a speaker, e.g., in a handset of mobile computing device 750. Such sound may include sound from voice telephone calls, may include recorded sound (e.g., voice messages, music files, etc.) and may also include sound generated by applications operating on mobile computing device 750.

Mobile computing device 750 may be implemented in a number of different forms, as shown in the figure. For example, mobile computing device 750 may be implemented as a cellular telephone 780. Mobile computing device 750 may also be implemented as part of a smart phone 782, personal digital assistant, or other similar mobile device.

Various implementations of the systems and techniques described herein can be realized in digital electronic circuitry, integrated circuitry, specially designed ASICs (application specific integrated circuits), computer hardware, firmware, software, and/or combinations thereof. These various implementations can include implementations in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, or code) include machine instructions for a programmable processor, and can be implemented in a high-level procedural and/or object-oriented programming language, and/or in assembly/machine language. As used herein, the terms "machine-readable medium" and "computer-readable medium" refer to any apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described herein can be implemented on a computer having a display device (e.g., a cathode ray tube (CRT) or liquid crystal display (LCD) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described herein can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

Systems and/or methods described herein may automatically determine a purpose or intent of a translation search query, and may adapt a translation and a translation user interface for the translation search query. For example, if the purpose of the translation search query is a dialog, the systems and/or methods may provide a dialog translation user interface for display. The dialog translation user interface may facilitate translation of a conversation within the confines of a device display. If the purpose of the translation search query is for something other than a dialog, the systems and/or methods may provide a non-dialog translation user interface for display. The non-dialog translation user interface may provide, for example, links to web sites with translation information.

The foregoing description of implementations provides illustration and description, but is not intended to be exhaustive or to limit the implementations to the precise form disclosed. Modifications and variations are possible in light of the above disclosure or may be acquired from practice of the implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the implementations may be implemented as a "component" that performs one or more functions. This component may include hardware, such as a processor, an ASIC, or a FPGA, or a combination of hardware and software.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
    receiving, by one or more processors of a device, a translation query,
        the translation query requesting a translation of one or more terms from a source language to a target language;
    determining, by the one or more processors, one or more translation features associated with the translation query;

assigning, by the one or more processors, a feature value to each of the one or more translation features to form one or more feature values;

applying, by the one or more processors, a feature weight to each of the one or more feature values, in a linear or non-linear manner, to generate a final value;

determining, by the one or more processors, whether to provide a dialog translation user interface or a non-dialog translation user interface based on whether the final value satisfies a threshold, the dialog translation user interface facilitating translation of a conversation, the non-dialog translation user interface providing:
one or more translation search results, and
one or more links to one or more documents that provide a translation from the source language to the target language, and the non-dialog translation user interface being different than the dialog translation user interface; and providing, by the one or more processors, the dialog translation user interface for display when the final value satisfies the threshold.

2. The method of claim 1, further comprising:
providing the non-dialog translation user interface for display when the final value does not satisfy the threshold.

3. The method of claim 1, further comprising:
receiving dialog training data and non-dialog training data;
training a classifier based on the one or more translation features, the dialog training data, and the non-dialog training data;
generating a plurality of feature weights based on the training of the classifier,
the feature weight, applied to each of the one or more feature values, being selected from the plurality of feature weights;
generating a trained classifier based on the plurality of feature weights;
storing the trained classifier; and
receiving the feature weight, applied to each of the one or more feature values, from the trained classifier.

4. The method of claim 1, further comprising:
generating a translation, of the translation query, in the target language associated with the translation query;
providing for display via the dialog translation user interface:
the translation of the translation query in the target language, and
the translation query in the source language;
generating a potential response to the translation query in the target language associated with the translation query; and
providing for display, via the dialog translation user interface, the potential response in the target language.

5. The method of claim 1, further comprising:
receiving an indication that a user approves of the dialog translation user interface; and
altering the threshold based on the indication.

6. The method of claim 1, further comprising:
receiving a request to export information from the dialog translation user interface to a messaging application; and
exporting the information from the dialog translation user interface to the messaging application based on the request.

7. The method of claim 1, further comprising:
providing an option, via the dialog translation user interface, to change the source language or the target language associated with the translation query; and
changing the source language or the target language when the option is selected by the user.

8. The method of claim 1, further comprising:
providing, via the dialog translation user interface, a dialog history in the source language and the target language associated with the translation query.

9. A non-transitory computer-readable medium for storing instructions, the instructions comprising:
one or more instructions that, when executed by one or more processors of a device, cause the one or more processors to:
receive a translation query,
the translation query requesting a translation of one or more terms from a source language to a target language,
determine one or more translation features associated with the translation query,
assign a feature value to each of the one or more translation features to form one or more feature values,
apply a feature weight to each of the one or more feature values, in a linear or non-linear manner, to generate a final value,
determine whether to provide a dialog translation user interface or a non-dialog translation user interface based on whether the final value satisfies a threshold,
the dialog translation user interface facilitating translation of a conversation,
the non-dialog translation user interface providing one or more links to one or more web sites that provide translation information, and
the non-dialog translation user interface being different than the dialog translation user interface,
provide the dialog translation user interface for display when the final value satisfies the threshold, and
provide the non-dialog translation user interface for display when the final value does not satisfy the threshold.

10. The non-transitory computer-readable medium of claim 9, where the instructions further comprise:
one or more instructions that, when executed by the one or more processors, cause the one or more processors to:
generate a translation, of the translation query, in the target language associated with the translation query,
provide for display via the dialog translation user interface:
the translation of the translation query in the target language, and
the translation query in the source language,
generate a potential response to the translation query in the target language associated with the translation query, and
provide for display, via the dialog translation user interface, the potential response in the target language.

11. The non-transitory computer-readable medium of claim 9, where the instructions further comprise:
one or more instructions that, when executed by the one or more processors, cause the one or more processors to:
receive dialog training data and non-dialog training data,
train a classifier based on the one or more translation features, the dialog training data, and the non-dialog training data,
generate a plurality of feature weights based on the training of the classifier, the feature weight, applied to each of the one or more feature values, being selected from the plurality of feature weights, generate a trained classifier based on the plurality of feature weights, store the trained classifier, and receive the feature weight, applied to each of the one or more feature values, from the trained classifier.

12. The non-transitory computer-readable medium of claim 9, where the instructions further comprise:

one or more instructions that, when executed by the one or more processors, cause the one or more processors to:

receive a request to export information from the dialog translation user interface to a messaging application, and export the information from the dialog translation user interface to the messaging application based on the request.

13. The non-transitory computer-readable medium of claim 9, where the instructions further comprise:

one or more instructions that, when executed by the one or more processors, cause the one or more processors to:

receive an indication that a user approves of the dialog translation user interface, and alter the threshold based on the indication.

14. The non-transitory computer-readable medium of claim 9, where the instructions further comprise:

one or more instructions that, when executed by the one or more processors, cause the one or more processors to:

provide an option, via the dialog translation user interface, to change the source language or the target language associated with the translation query, and change the source language or the target language when the option is selected by the user.

15. The non-transitory computer-readable medium of claim 9, where the instructions further comprise:

one or more instructions that, when executed by the one or more processors, cause the one or more processors to:

provide, via the dialog translation user interface, a dialog history in the source language and the target language associated with the translation query.

16. A device comprising:

one or more processors to:

receive a translation query, the translation query requesting a translation of one or more terms from a source language to a target language, determine one or more translation features associated with the translation query, generate a value based on the one or more translation features, determine whether to provide a dialog translation user interface or a non-dialog translation user interface based on whether the value satisfies a threshold, the dialog translation user interface facilitating translation of a conversation, the non-dialog translation user interface providing one or more links to one or more websites that provide a translation from the source language to the target language, and the non-dialog translation user interface being different than the dialog translation user interface, provide the dialog translation user interface for display when the value satisfies the threshold, and provide the non-dialog translation user interface for display when the value does not satisfy the threshold.

17. The device of claim 16, where the one or more processors are further to:

receive an indication that a user approves of the dialog translation user interface, and alter the threshold based on the indication.

18. The device of claim 16, where the one or more processors are further to:

receive a request to export information from the dialog translation user interface to a messaging application, and export the information from the dialog translation user interface to the messaging application based on the request.

19. The device of claim 16, where the one or more processors are further to:

receive dialog training data and non-dialog training data, train a classifier based on the one or more translation features, the dialog training data, and the non-dialog training data, generate a plurality of feature weights based on the training of the classifier, generate a trained classifier based on the plurality of feature weights, store the trained classifier, receive a feature weight from the plurality of feature weights of the trained classifier, assign a feature value to each of the one or more translation features to form one or more feature values, and apply the feature weight to each of the one or more feature values to generate the value.

20. The device of claim 16, where the one or more processors are further to:

generate a translation, of the translation query, in the target language associated with the translation query, provide for display via the dialog translation user interface:

the translation of the translation query in the target language, and the translation query in the source language, generate a potential response to the translation query in the target language associated with the translation query, and provide for display, via the dialog translation user interface, the potential response in the target language.

\* \* \* \* \*